(12) United States Patent
Hosseini et al.

(10) Patent No.: US 11,805,448 B2
(45) Date of Patent: Oct. 31, 2023

(54) RESOURCE RESERVATION IN SIDELINK COMMUNICATIONS

(71) Applicant: QUALCOMM Incorporated, San Diego, CA (US)

(72) Inventors: Seyedkianoush Hosseini, San Diego, CA (US); Gabi Sarkis, San Diego, CA (US); Wei Yang, San Diego, CA (US); Qing Li, Princeton Junction, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/647,545

(22) Filed: Jan. 10, 2022

(65) Prior Publication Data

US 2022/0232426 A1    Jul. 21, 2022

Related U.S. Application Data

(60) Provisional application No. 63/199,674, filed on Jan. 15, 2021.

(51) Int. Cl.
| | |
|---|---|
| *H04W 28/26* | (2009.01) |
| *H04W 76/28* | (2018.01) |
| *H04W 28/02* | (2009.01) |
| *H04W 92/18* | (2009.01) |

(52) U.S. Cl.
CPC ....... *H04W 28/26* (2013.01); *H04W 28/0289* (2013.01); *H04W 76/28* (2018.02); *H04W 92/18* (2013.01)

(58) Field of Classification Search
CPC . H04W 28/26; H04W 28/0289; H04W 76/28; H04W 92/18; H04W 74/0808
See application file for complete search history.

(56) References Cited

U.S. PATENT DOCUMENTS

| | | | |
|---|---|---|---|
| 2022/0225408 A1* | 7/2022 | Lee | H04W 74/0808 |
| 2022/0232667 A1* | 7/2022 | Back | H04W 76/28 |

FOREIGN PATENT DOCUMENTS

| | | | |
|---|---|---|---|
| WO | WO-2022025524 A1 | * | 2/2022 |
| WO | WO-2022103147 A1 | * | 5/2022 |

* cited by examiner

*Primary Examiner* — Ivan O Latorre
(74) *Attorney, Agent, or Firm* — Harrity & Harrity, LLP

(57) ABSTRACT

Various aspects of the present disclosure generally relate to wireless communication. In some aspects, a transmit user equipment (UE) may determine that a channel busy ratio satisfies a channel busy ratio threshold. The transmit UE may reserve, based at least in part on determining that the channel busy ratio satisfies the channel busy ratio threshold, a resource for transmission of a packet with a particular priority to the receive UE, wherein the resource is in a set of resources outside of a sidelink discontinuous reception (DRX) on duration of a receive UE. The transmit UE may transmit the packet using the resource based at least in part on reserving the resource.

30 Claims, 10 Drawing Sheets

RESOURCE RESERVATION IN SIDELINK COMMUNICATIONS

CROSS-REFERENCE TO RELATED APPLICATION

This Patent Application claims priority to U.S. Provisional Patent Application No. 63/199,674, filed on Jan. 15, 2021, entitled "RESOURCE RESERVATION IN SIDELINK COMMUNICATIONS," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for resource reservation in sidelink communications.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LIE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

One aspect provides, a method of wireless communication performed by a transmit user equipment (UE) including determining that a channel busy ratio satisfies a channel busy ratio threshold; reserving, based at least in part on determining that the channel busy ratio satisfies the channel busy ratio threshold, a resource for transmission of a packet with a particular priority to the receive UE, wherein the resource is in a set of resources outside of a sidelink discontinuous reception (DRX) on duration of a receive UE; and transmitting the packet using the resource based at least in part on reserving the resource.

Other aspects provide an apparatus operable, configured, or otherwise adapted to perform the aforementioned method as well as those described elsewhere herein; a non-transitory, computer-readable media comprising instructions that, when executed by one or more processors of an apparatus, cause the apparatus to perform the aforementioned method as well as those described elsewhere herein; a computer program product embodied on a computer-readable storage medium comprising code for performing the aforementioned method as well as those described elsewhere herein; and an apparatus comprising means for performing the aforementioned method as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for resource reservation in sidelink communications.

Discontinuous reception (DRX) modes may be deployed to provide power savings for a user equipment (UE). For example, DRX may be configured for an access link (e.g., the Uu link) between a UE and a base station. DRX may include on durations, in which the UE is actively communicating or monitoring for communications, and off durations, in which the UE is not actively communicating or monitoring for communications (or in which the UE reduces a quantity of antennas, an antenna power, a number of resources, or another communication configuration). In this way, UE power consumption is reduced.

In sidelink DRX, UEs may use DRX cycles to reduce power consumption associated with sidelink communications and associated monitoring. Different UEs may have different sidelink DRX configurations that result in different on durations. For example, in a particular resource pool, a first UE and a second UE may be in an on duration during a first set of slots and/or for a first duration and a third UE and a fourth UE may be in an on duration during a second set of slots and/or for a second duration. It may be desirable to allow the first UE to reserve a resource outside of an on duration of the second UE. In such a case, the second UE may extend a DRX on duration (which may also be termed an "active" or "awake" time) using an inactivity timer, which may cause a first DRX pattern (of the second UE) to become misaligned with a second DRX pattern (of the third UE and the fourth UE). As a result, the third UE may not be in an on duration when the first UE reserved resources outside of the on duration of the second UE. In this case, the third UE may not detect the reservation of a resource by the first UE and may attempt to communicate with the fourth UE during the reserved resource. This may cause a collision and associated interference with the first UE.

Some aspects described herein provide for resource reservation in sidelink communications with a reduced impact of a use of an inactivity timer. For example, a transmit (TX) UE may reserve resources outside of an on duration of a first DRX pattern of a first receive (RX) UE based at least in part on a level of network traffic (e.g., when a level of network traffic is low) to reduce a likelihood of a collision with transmissions to a second RX UE with a second DRX pattern. In contrast, when the level of network traffic is relatively high (and an associated likelihood of collision from misaligned DRX patterns is relatively high), the TX UE may forgo reserving resources outside of the on duration of the RX UE.

Introduction to Wireless Communication Networks

Figure 1:
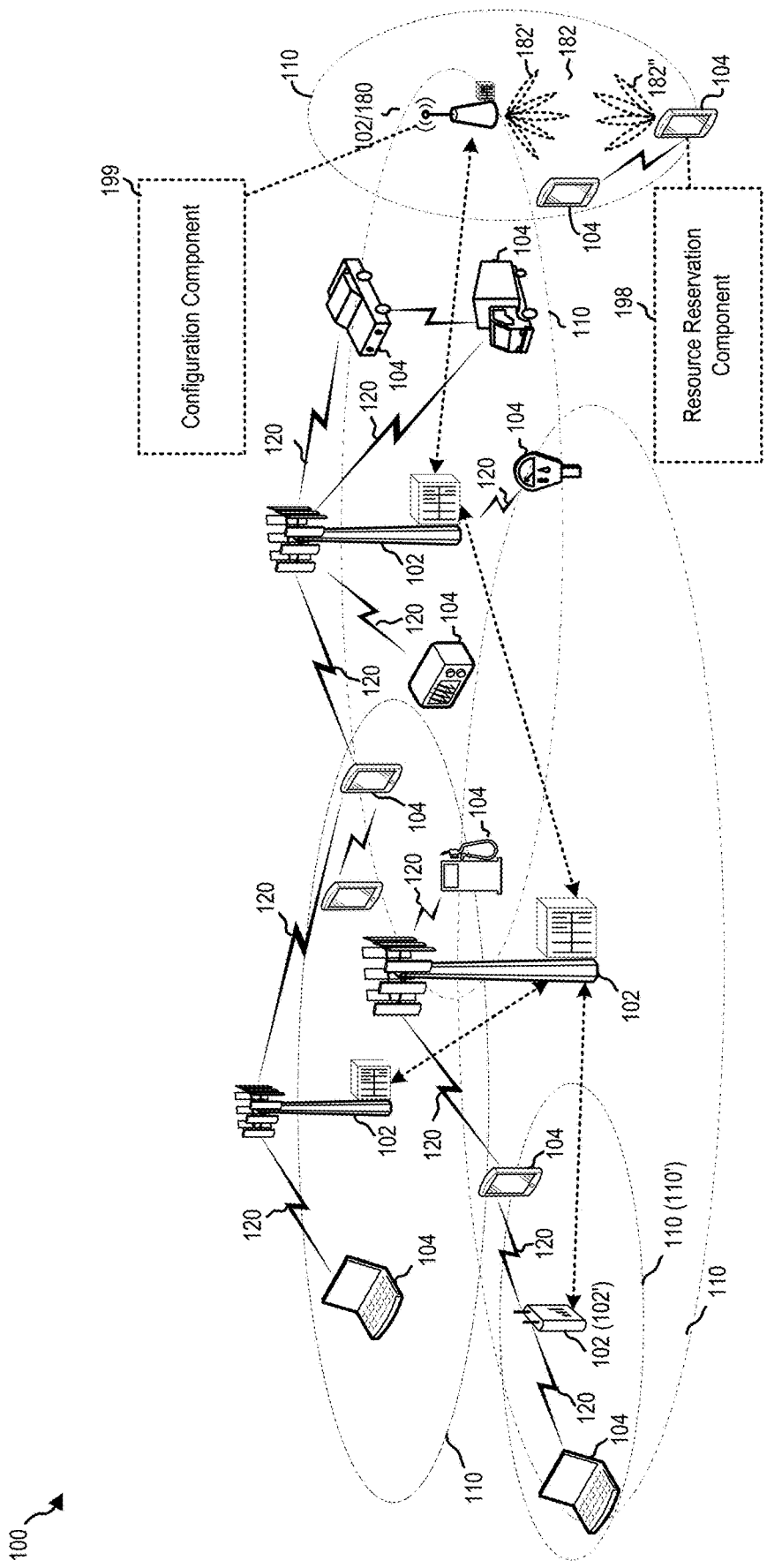
FIG. 1 is a diagram illustrating an example of a wireless network, in accordance with the present disclosure.

FIG. 1 depicts an example of a wireless communications system 100, in which aspects described herein may be implemented.

Generally, wireless communications system 100 includes base stations (BSs) 102, UEs 104, and one or more core networks, such as an Evolved Packet Core (EPC) and a 5G Core (5GC) network, which interoperate to provide wireless communications services.

Base stations 102 may provide an access point to the EPC and/or 5GC for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a "gNB," "NodeB," "eNB," "ng-eNB" (e.g., an eNB that has been enhanced to provide connection to both EPC and 5GC), an "access point," a "base transceiver station," a "radio base station," a "radio transceiver," a "transceiver function," or a "transmission reception point" ("TRP") in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as "reverse link") transmissions from a UE 104 to a base station 102 and/or downlink (DL) (also referred to as "forward link") transmissions from a base station 102 to a UE 104. The communication links 120 may use multiple-input and multiple-output (MIMO) antenna technology, including spatial multiplexing, beamforming, and/or transmit diversity in various aspects.

Examples of a UE 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. UEs 104 may be Internet of Things (IoT) devices (e.g., parking meters, gas pumps, toasters, vehicles, heart monitors, or other IoT devices), always on (AON) devices, or edge processing devices. A UE 104 may also be referred to more generally as a "station," a "mobile station," a "subscriber station," a "mobile unit," a "subscriber unit," a "wireless unit," a "remote unit," a "mobile device," a "wireless device", a "wireless communications device," a "remote device," a "mobile subscriber station," an "access terminal," a "mobile terminal," a "wireless terminal," a "remote terminal," a "handset," a "user agent," a "mobile client," or a "client."

Communications using higher frequency bands may have higher path loss and a shorter range compared to lower frequency communications. Accordingly, certain base stations (e.g., base station 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication system 100 includes configuration component 199, which may be configured to configure UE 104 for communication (e.g., on a sidelink with another UE 104).

Wireless communication system 100 further includes resource reservation component 198, which may be configured to reserve a resource based at least in part on a channel busy ratio of a network.

Figure 2:
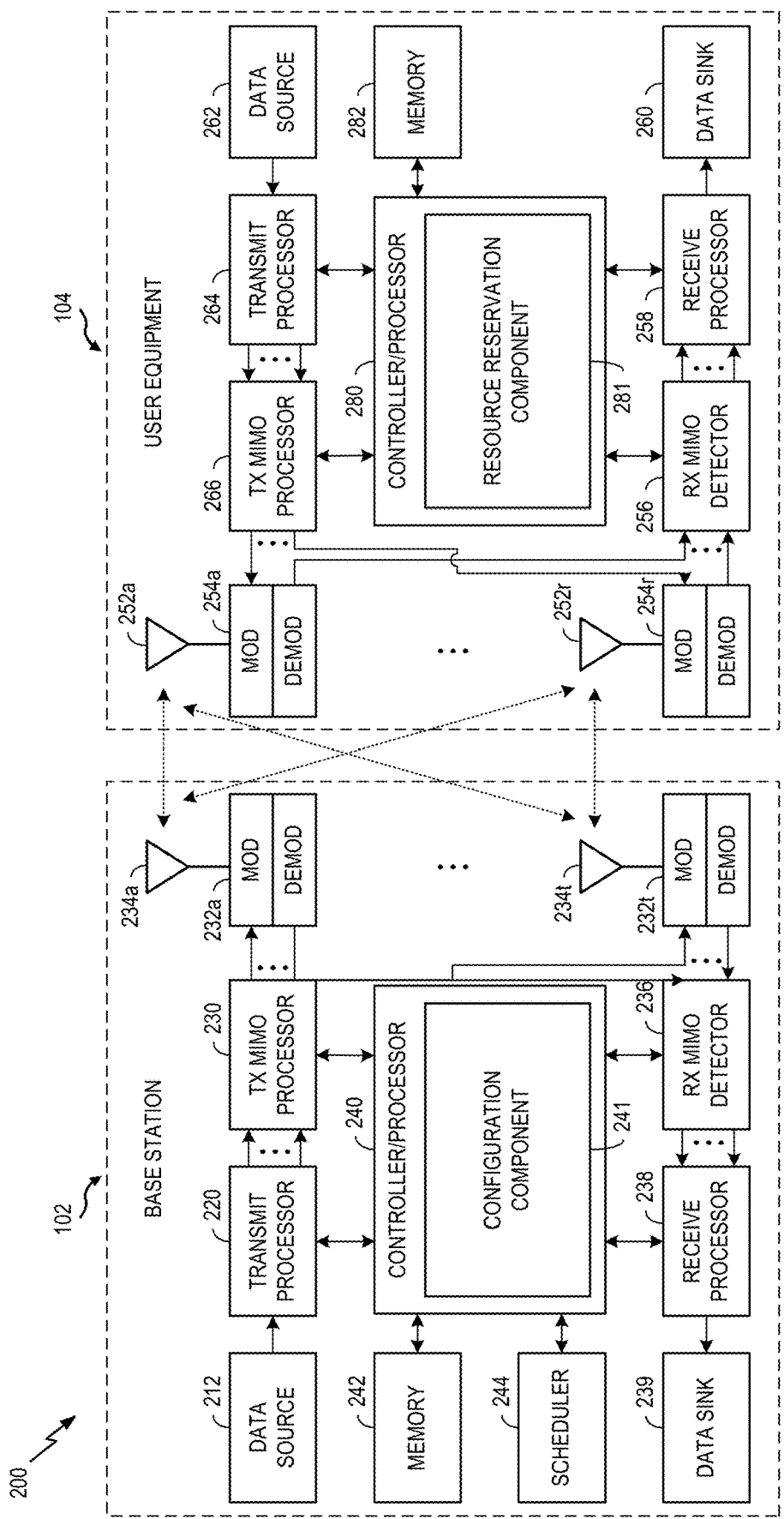
FIG. 2 is a diagram illustrating an example of a base station in communication with a user equipment (UE) in a wireless network, in accordance with the present disclosure.

FIG. 2 depicts aspects of an example BS 102 and a UE 104.

Generally, base station 102 includes various processors (e.g., 220, 230, 236, 238, and 240), a memory 242, a scheduler 244, antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and UE 104.

Base station 102 includes controller/processor 240, which may be configured to implement various functions related to wireless communications. In the depicted example, controller/processor 240 includes configuration component 241, which may be representative of configuration component 199 of FIG. 1. Notably, while depicted as an aspect of controller/processor 240, configuration component 241 may be implemented additionally or alternatively in various other aspects of base station 102 in other implementations.

Generally, UE 104 includes various processors (e.g., 256, 258, 264, 266, and 280), a memory 282, antennas 252a-r (collectively 252), transceivers 254a-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes resource reservation component 281, which may be representative of resource reservation component 198 of FIG. 1. Notably, while depicted as an aspect of controller/processor 280, resource reservation component 281 may be implemented additionally or alternatively in various other aspects of UE 104 in other implementations.

Figure 3:
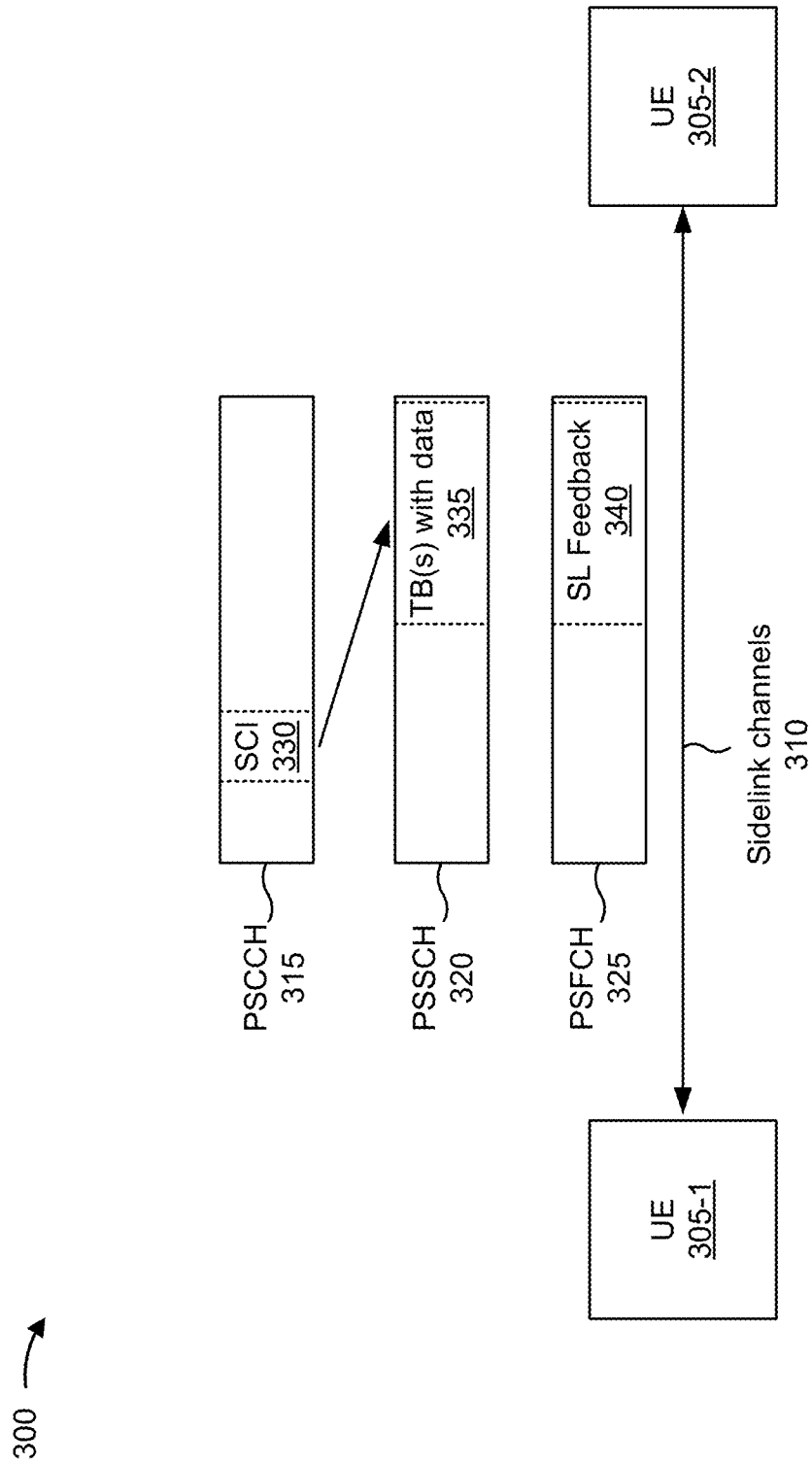
FIG. 3 is a diagram illustrating an example of sidelink communications, in accordance with the present disclosure.

FIG. 3 is a diagram illustrating an example 300 of sidelink communications, in accordance with various aspects of the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for peer-to-peer (P2P) communications, device-to-device (D2D) communications, vehicle-to-everything (V2X) communications (e.g., which may include vehicle-to-vehicle (V2V) communications, vehicle-to-infrastructure (V2I) communications, and/or vehicle-to-pedestrian (V2P) communications) and/or mesh networking. In some aspects, the UEs 305 (e.g., UE 305-1 and/or UE 305-2) may correspond to one or more other UEs described elsewhere herein, such as UE 104. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station via an access link or an access channel. The PSSCH 320 may be used to communicate data, similar to a physical downlink shared channel (PDSCH) and/or a physical uplink shared channel (PUSCH) used for cellular communications with a base station via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 102). In some aspects, the UE 305 may perform resource selection and/or scheduling by sensing channel availability for transmissions. For example, the UE 305 may measure an received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
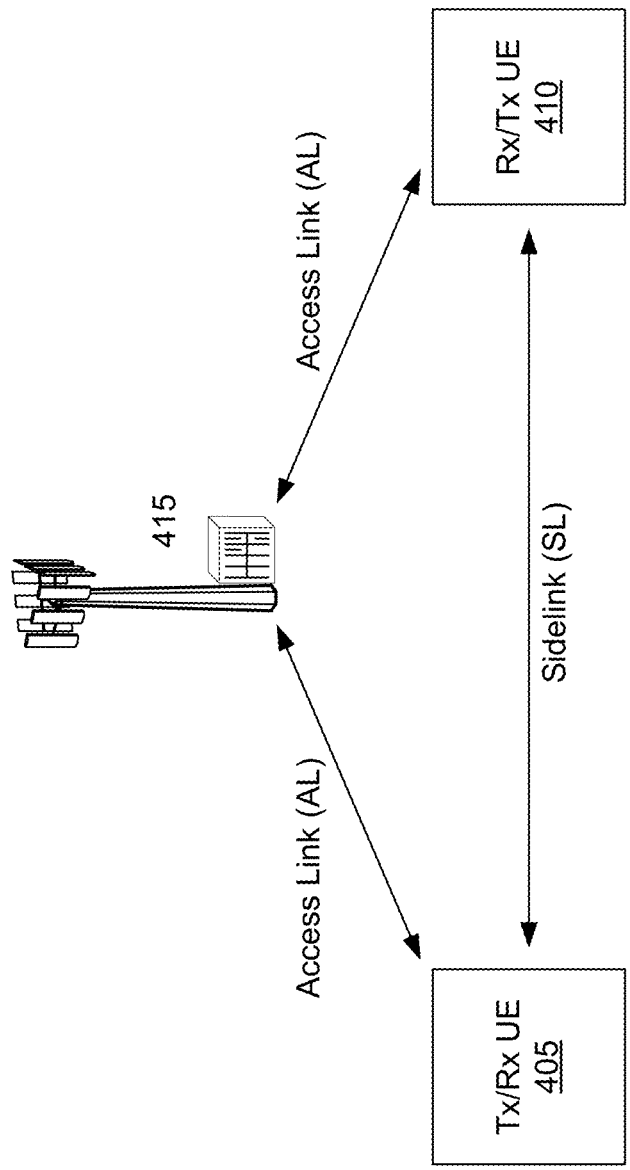
FIG. 4 is a diagram illustrating an example of sidelink communications and access link communications, in accordance with the present disclosure.

FIG. 4 is a diagram illustrating an example 400 of sidelink communications and access link communications, in accordance with various aspects of the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 415 may communicate with the Tx/Rx UE 405 via a first access link. Additionally, or alternatively, in some sidelink modes, the base station 415 may communicate with the Rx/Tx UE 410 via a second access link. The Tx/Rx UE 405 and/or the Rx/Tx UE 410 may correspond to one or more UEs described elsewhere herein, such as the UE 104 of FIG. 1. Thus, a direct link between UEs 104 (e.g., via a PC5 interface) may be referred to as a sidelink, and a direct link between a base station 102 and a UE 104 (e.g., via a Uu interface) may be referred to as an access link. Sidelink communications may be transmitted via the sidelink, and access link communications may be transmitted via the access link. An access link communication may be either a downlink communication (from a base station 102 to a UE 104) or an uplink communication (from a UE 104 to a base station 102).

As indicated above, FIG. 4 is provided as an example. Other examples may differ from what is described with respect to FIG. 4.

Figure 5:
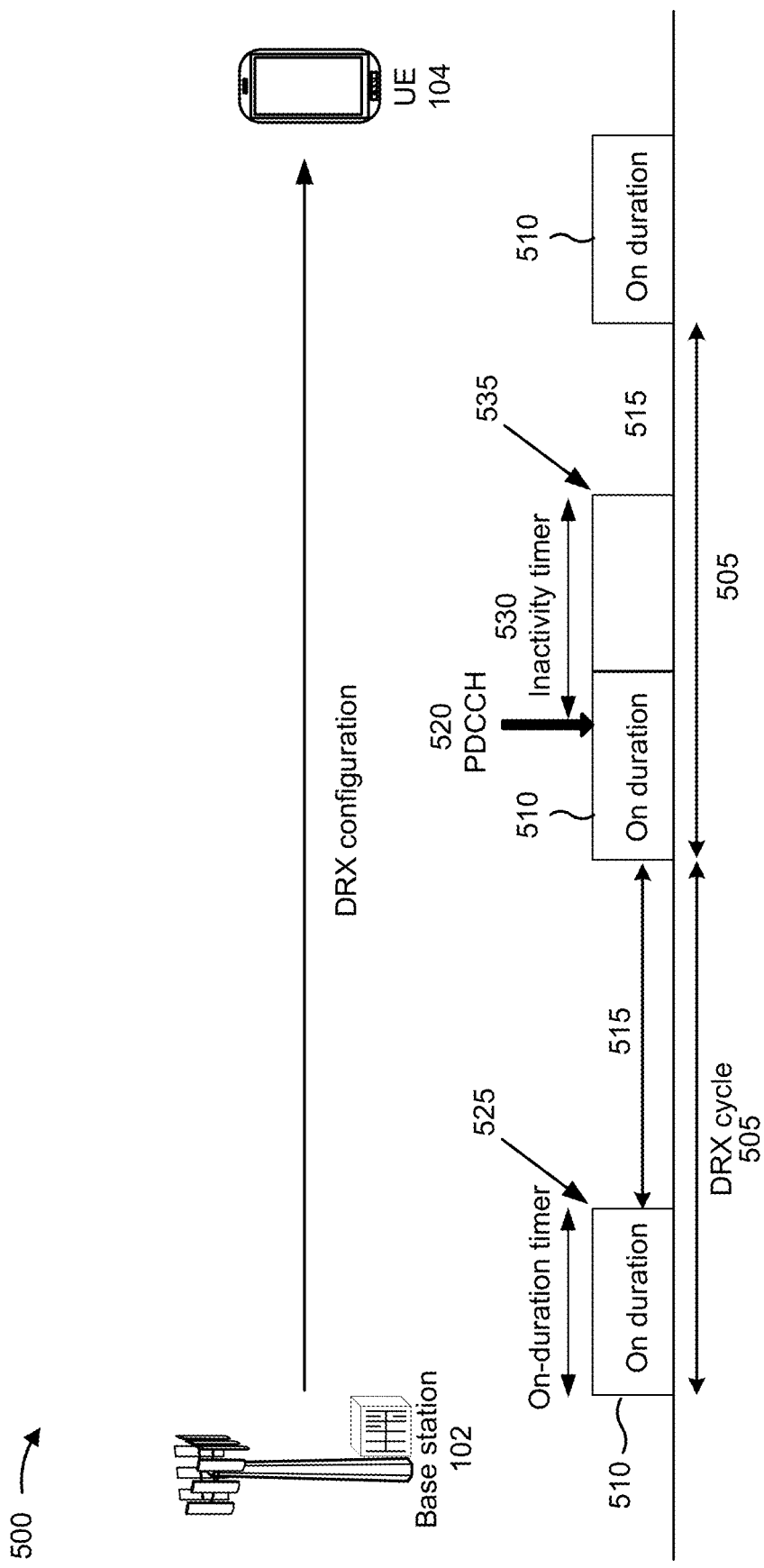
FIG. 5 is a diagram illustrating an example of a discontinuous reception (DRX) configuration, in accordance with the present disclosure.

FIG. 5 is a diagram illustrating an example 500 of a DRX configuration, in accordance with various aspects of the present disclosure.

As shown in FIG. 5, a base station 102 may transmit a DRX configuration to a UE 104 to configure a DRX cycle 505 (a Uu link DRX cycle, as shown) for the UE 104. A DRX cycle 505 may include a DRX on duration 510 (e.g., during which a UE 104 is awake or in an active state) and an opportunity to enter a DRX sleep state 515. In another example, the DRX cycle 505 may be a sidelink (SL) DRX cycle that is configured by the base station 102 and may be set across a group of UEs 104 (e.g., for unicast communication) or set based at least in part on an application identifier or layer 2 (L2) identifier (e.g., for connectionless groupcast or broadcast communication).

The time during which the UE 104 is configured to be in an active state during the DRX on duration 510 may be referred to as an active time, and the time during which the UE 104 is configured to be in the DRX sleep state 515 may be referred to as an inactive time. As described below, the UE 104 may monitor a PDCCH during the active time and may refrain from monitoring the PDCCH during the inactive time.

During the DRX on duration 510 (e.g., the active time), the UE 104 may monitor a downlink control channel (e.g., a PDCCH), as shown by reference number 520. For example, the UE 104 may monitor the PDCCH for downlink control information (DCI) pertaining to the UE 104. If the UE 104 does not detect and/or successfully decode any PDCCH communications intended for the UE 104 during the DRX on duration 510, then the UE 104 may enter the sleep state 515 (e.g., for the inactive time) at the end of the DRX on duration 510, as shown by reference number 525. In this way, the UE 104 may conserve battery power and reduce power consumption. Alternatively, if the UE 104 receives sidelink control information (SCI) (e.g., in a scenario where the DRX cycle 505 is a sidelink DRX cycle) that indicates a resource is reserved by a transmitter UE outside of an on duration of the UE 104 (e.g., a receive UE) and if an inactivity timer is configured and set to a non-zero value, the UE 104 may remain in an on duration 510. In this case, remaining in the on duration 510 enables sidelink communication without interruption. As shown, the DRX cycle 505 may repeat with a configured periodicity according to the DRX configuration.

If the UE 104 detects and/or successfully decodes a PDCCH communication intended for the UE 104, then the UE 104 may remain in an active state (e.g., awake) for the duration of a DRX inactivity timer 530 (e.g., which may extend the active time). The UE 104 may start the DRX inactivity timer 530 at a time at which the PDCCH communication is received (e.g., in a TTI in which the PDCCH communication is received, such as a slot or a subframe). The UE 104 may remain in the active state until the DRX inactivity timer 530 expires, at which time the UE 104 may enter the sleep state 515 (e.g., for the inactive time), as shown by reference number 535. During the duration of the DRX inactivity timer 530, the UE 104 may continue to monitor for PDCCH communications, may obtain a downlink data communication (e.g., on a downlink data channel, such as a PDSCH) scheduled by the PDCCH communication, and/or may prepare and/or transmit an uplink communication (e.g., on a PUSCH) scheduled by the PDCCH communication. The UE 104 may restart the DRX inactivity timer 530 after each detection of a PDCCH communication for the UE 104 for an initial transmission (e.g., but not for a retransmission). By operating in this manner, the UE 104 may conserve battery power and reduce power consumption by entering the sleep state 515.

As indicated above, FIG. 5 is provided as an example. Other examples may differ from what is described with respect to FIG. 5.

Figure 6:
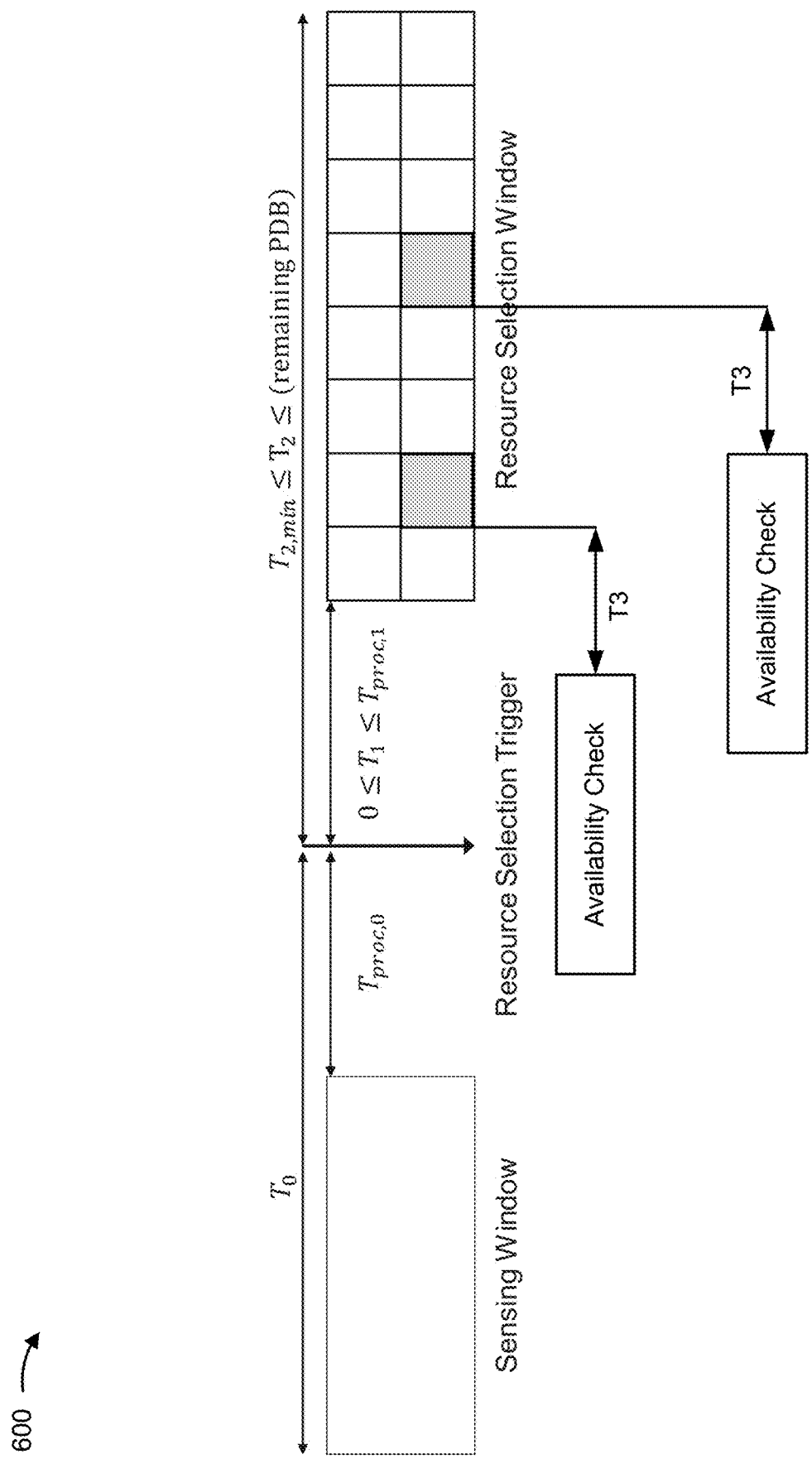
FIG. 6 is a diagram illustrating an example of resource selection using a sensing procedure, in accordance with the present disclosure.

FIG. 6 is a diagram illustrating an example 600 of resource selection using a sensing procedure, in accordance with various aspects of the present disclosure.

As shown in FIG. 6, a UE may use a sensing procedure to select resources for sidelink communication, such as described above in connection with FIGS. 3 and 4. For example, a UE configured for communication in an NR network may perform the sensing procedure of example 600.

As shown in FIG. 6, a UE may perform a sensing procedure in a sensing window. In some cases, the sensing window may be 100 milliseconds (ms) (e.g., for aperiodic resource reservation, such as aperiodic reservation in one or more slots of up to 32 logical slots in the future) or 1100 ms (e.g., for periodic resource reservation). In some cases, a UE configured for communication in an NR network may use a sensing procedure for aperiodic or periodic resource reservation.

According to the sensing procedure, the UE may decode control messages relating to resource reservations of other UEs, as well as perform measurements (e.g., RSRP measurements) associated with one or more sidelink channels. For example, UEs may transmit reservation information (e.g., in SCI) that indicates a resource reservation for a current slot (e.g., the slot in which the reservation information is transmitted) and for one or more (e.g., up to two) future slots. A resource allocation associated with a resource reservation may be one or more sub-channels in a frequency domain and one slot in a time domain. In some cases, a resource reservation may be aperiodic or periodic. In periodic resource reservation, a UE may signal (e.g., in the reservation information in SCI) a period for the resource reservation (e.g., a value between 0 ms and 1000 ms). Periodic resource reservation may be disabled by configuration in some UEs.

As shown in FIG. 6, the UE may determine to select resources for a sidelink communication based at least in part on a resource selection trigger. For example, resource selection may be triggered when the UE has a packet that is to be transmitted. Based at least in part on the resource selection trigger, the UE may determine one or more resources that are available for selection in a resource selection window. That is, the UE may determine the one or more available resources based at least in part on the sensing procedure performed by the UE. For example, the sensing procedure may provide an indication of resources in the resource selection window that are occupied and/or resources in the resource selection window associated with high interference.

In some cases, if a resource selection trigger occurs in a subframe n, the resource selection window is from $n+T_1$ to $n+T_2$. In this case, $T_1$ may be less than a processing time ($T_{proc,1}$) (e.g., for NR). Moreover, $T_2$ may be greater than or equal to $T_{2,min}$, which may be a value configured for the UE based at least in part on a priority of the UE, and less than or equal to 100 or a remaining packet delay budget (PDB) of the UE (e.g., for NR, $T_2$ may be less than or equal to a remaining PDB). In some cases, the UE may perform an availability check before reserving and using a resource. For example, after the sensing window, but a threshold amount of time, $T_3$, before a particular resource, the UE may determine that a particular resource is available, reserve the resource, and, subsequently, use the resource for communication.

As indicated above, FIG. 6 is provided as an example. Other examples may differ from what is described with respect to FIG. 6.

Figure 7:
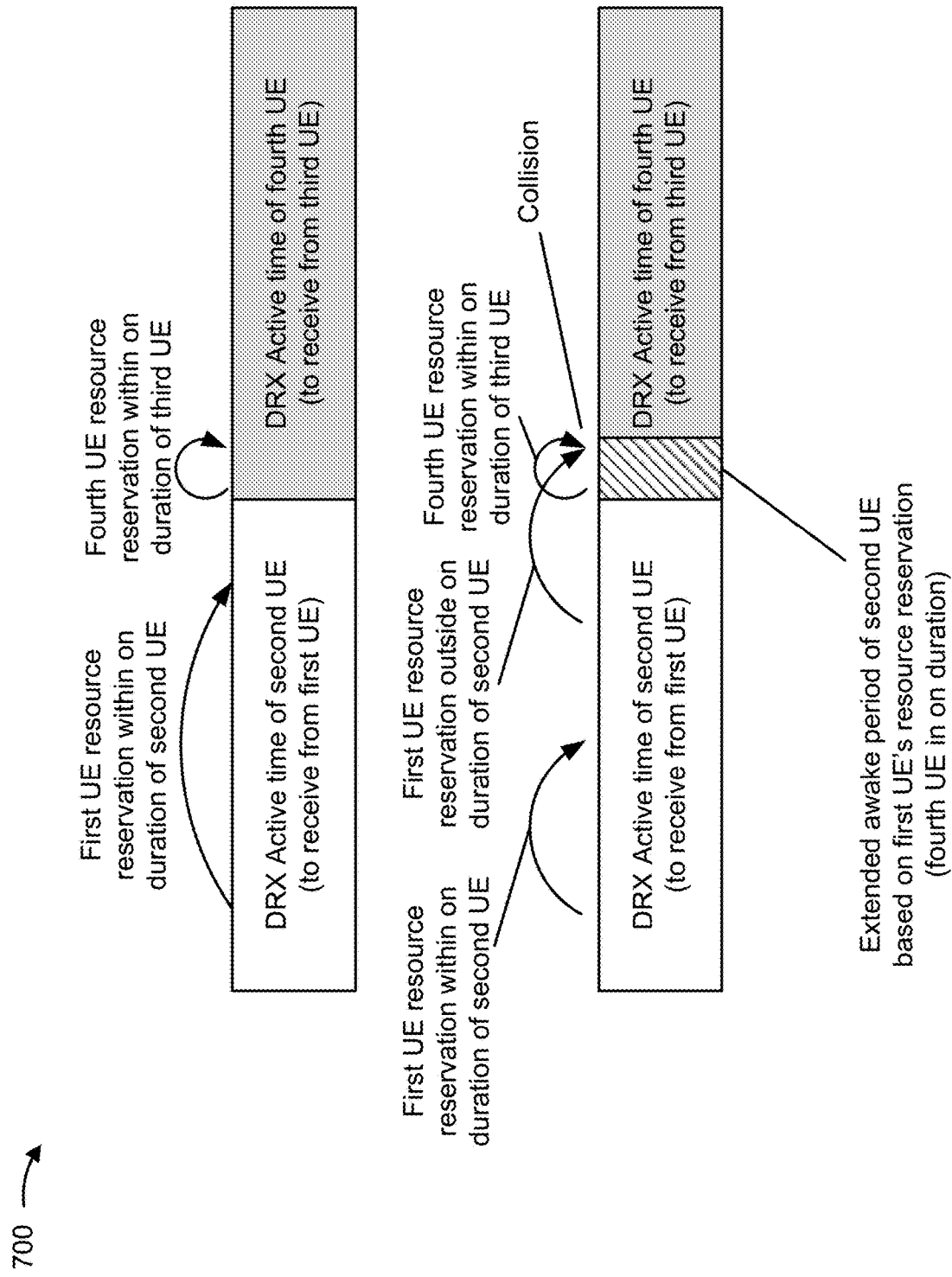
FIG. 7 is a diagram illustrating an example of DRX configuration with multiple DRX patterns, in accordance with the present disclosure.

FIG. 7 is a diagram illustrating an example 700 of DRX configuration with multiple DRX patterns, in accordance with various aspects of the present disclosure.

As described above, DRX may be configured for an access link (e.g., the Uu link) between a UE and a BS. In such cases, the UE may receive a PDCCH and start an inactivity timer. After the inactivity timer expires, the UE may enter a DRX cycle. The UE may be configured with multiple DRX cycles, such as a DRX short cycle (with a relatively short periodicity) and a DRX long cycle (with a relatively long periodicity). In this way, UE power consumption is reduced, without a negative impact to communication performance, relative to configuring a UE with a single DRX cycle.

In sidelink DRX, UEs may use DRX cycles to reduce power consumption associated with sidelink communications and associated monitoring. Different UEs may have different sidelink DRX configurations that result in different on durations. For example, in a particular resource pool, a first UE and a second UE may be in an on duration during a first set of slots and/or for a first duration and a third UE and a fourth UE may be in an on duration during a second set of slots and/or for a second duration. For resource reservation, as described above, it may be desirable to have an alignment between DRX patterns. For example, it may be desirable for DRX patterns to have fully overlapping on durations or fully non-overlapping on durations. A sidelink Tx UE should be aware of the DRX configuration of a sidelink Rx UE to be able to communicate with it. If, in addition, the sidelink Tx UE is itself configured with DRX for its reception, the two UEs should have an aligned DRX configuration A first UE may attempt to reserve a resource, as shown in FIG. 7 (e.g., for communication with a second UE that is configured with a first DRX pattern). A third UE may be communicating with a fourth UE with a second DRX pattern. When the first UE attempts to reserve a resource outside of the on duration of the second UE, the second UE may extend a DRX active or awake time using an inactivity timer, which may cause the first DRX pattern of the second UE to become misaligned with the second DRX pattern of the fourth UE. If the third UE uses the second DRX pattern as well, the third UE may not be in an on duration when the first UE reserved resources outside of the on duration of the second UE. As a result, the third UE may not detect the reservation of a resource by the first UE and may attempt to communicate with the fourth UE during the resource. This may cause a collision and associated interference with the first UE.

As indicated above, FIG. 7 is provided as an example. Other examples may differ from what is described with respect to FIG. 7.

As described above, a lack of alignment between DRX patterns may result in colliding communications, which may cause interference and poor network performance. A UE may be configured with a DRX inactivity timer, such as when a PDB is less than a threshold. When there is more data for a TX UE to transmit and/or more data for an RX UE to receive, the TX UE may determine to select resources outside of an on duration of the RX UE, which may be configured with a DRX inactivity timer and remain awake to receive transmissions on the selected resources. However, when a TX UE selects resources from outside of a first RX UE's on duration, the TX UE may transmit during a second RX UE's on duration, which may cause interference. As a result, use of the inactivity timer may cause a collision, which may result in interference and poor network performance.

Some aspects described herein provide for resource reservation in sidelink communications with a reduced impact of a use of an inactivity timer. For example, a TX UE may reserve resources outside of an on duration of a first DRX pattern of a first RX UE based at least in part on a level of network traffic (e.g., when network traffic is low) to reduce a likelihood of a collision with transmissions to a second RX UE with a second DRX pattern. Correspondingly, when resources are reserved for transmission by the TX UE outside of the on duration of the first RX UE, the RX UE may remain awake for an amount of time indicated by an inactivity timer. In this case, when a level of network traffic is relatively high (and an associated likelihood of collision), a TX UE may forgo reserving resources outside of an on duration and an RX UE may forgo using an inactivity timer to remain awake. In contrast, when the level of network traffic is relatively low (and an associated likelihood of collision from misaligned DRX patterns is relatively low), the TX UE may reserve resources outside of the on duration of the RX UE and the RX UE may use an inactivity timer to remain awake for sidelink DRX communication.

To reserve a resource outside of an on duration of an RX UE, a TX UE may determine whether a CBR is less than a threshold and may make a resource reservation for sidelink communication based at least in part on the CBR being less than a threshold. Additionally, or alternatively, the TX UE may make the resource reservation based at least in part on one or more other parameters, such as a packet priority, a channel occupancy ratio (CR), or a PDB, among other examples. In this way, the TX UE may determine a status of an inactivity timer of the RX UE (which, as described above, is based at least in part on a level of network traffic, which corresponds to the CBR), which enables the TX UE to reserve a resource, outside of an on duration of the RX UE, with a reduced likelihood of a collision with other transmissions.

Figure 8:
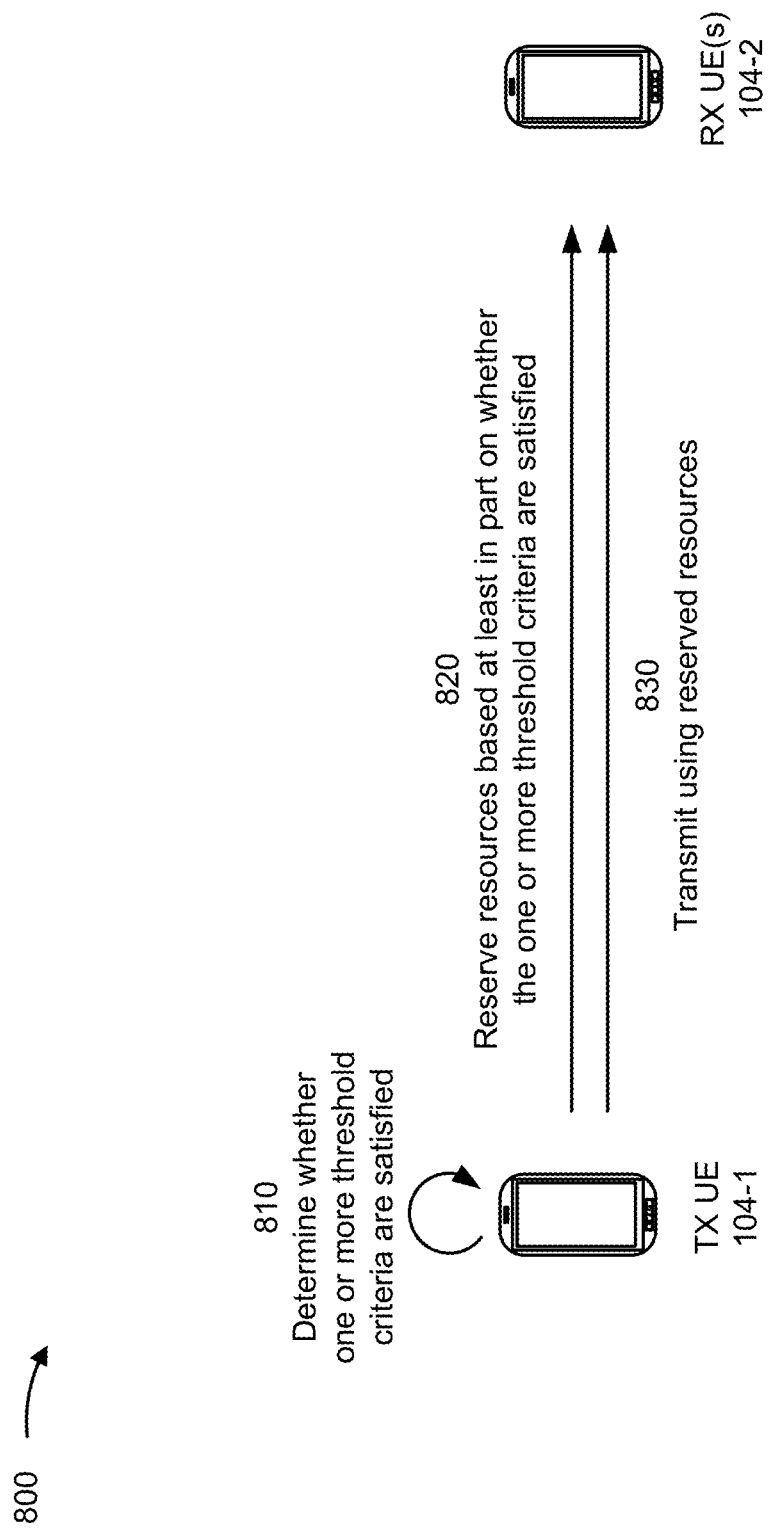
FIG. 8 is a diagram illustrating an example associated with resource reservation in sidelink communications, in accordance with the present disclosure.

FIG. 8 is a diagram illustrating an example 800 associated with resource reservation in sidelink communications, in accordance with various aspects of the present disclosure. As shown in FIG. 8, example 800 includes communication between UEs 104 via a sidelink. In some aspects, the UEs 104 may be included in a wireless network, such as wireless communication system 100.

As further shown in FIG. 8, and by reference number 810, a first UE 104-1 (which may be termed a TX UE with regards to a particular resource reservation for transmission or retransmission of a particular packet) may determine whether one or more threshold criteria for resource reservation are satisfied. For example, first UE 104-1 may determine whether to make a resource reservation for a transmission of a packet with a particular priority based at least in part on whether a CBR is less than a CBR threshold. In some aspects, first UE 104-1 may make a reservation for a retransmission of the packet outside the on duration of second UE 104-2 (e.g., to re-transmit a communication that was attempted during the on duration of second UE 104-2). For example, first UE 104-1 may attempt to transmit a packet during the on duration of second UE 104-2, detect a failure of the transmission of the packet (e.g., based at least in part on a feedback message), and may attempt to retransmit the packet using a resource outside the on duration of second UE 104-2 to avoid an excessive delay (until a next on duration of second UE 104-2) to transmit the packet.

In this case, to reserve a resource with a reduced likelihood of causing a collision, the first UE 104-1 may determine whether to reserve a resource outside of an on duration of a second UE 104-2 (an RX UE) and the second UE 104-2 may similarly determine whether to use an inactivity timer and remain in an awake state to receive a transmission on the resource. In other words, second UE 104-2 may use the inactivity timer when first UE 104-1 makes a resource reservation and first UE 104-1 makes the resource reservation within a particular set of slots corresponding to a value of the inactivity timer of second UE 104-2.

The CBR in a slot may be defined as a portion of sub-channels in a resource pool whose sidelink RSSI exceeds a configured threshold based at least in part on sensing performed over a CBR measurement window (which is defined by a higher layer parameter). In some aspects, first UE 104-1 may perform the sensing to determine the CBR. In some aspects, first UE 104-1 may perform the sensing to determine a CBR range. For example, in each resource pool for sidelink communications and for each proximity-based service (ProSe) per-packet priority (PPPP), a plurality of CBR ranges are configured. In this case, first UE 104-1 may determine a CBR range for a current CBR and may determine whether a CR corresponding to the CBR is satisfied.

Additionally, or alternatively, first UE 104-1 may determine whether one or more other threshold criteria are satisfied, such as a maximum transmit power threshold, a PDB threshold is satisfied, or an MCS range is satisfied, among other examples. Based at least in part on determining whether one or more threshold criteria are satisfied, first UE 104-1 determines whether to make a resource reservation outside of a DRX on duration of second UE 104-2.

Additionally, or alternatively, first UE 104-1 may determine a span of resources in which to make a resource reservation and/or a quantity of resource reservations that can be made. For example, in some aspects, each CBR range in a resource pool and/or packet priority may be associated with a particular range of resources in which a resource reservation can be made and/or a particular quantity of resource reservations that can be made within the particular range of resources. In other words, when CBR is relatively high (and the resource pool is relatively congested) and/or the packet priority is relatively low, first UE 104-1 may determine to make a single resource reservation in a relatively small set of resources outside of second UE 104-2's on duration (or may forgo making a resource reservation outside an on duration of second UE 104-2). In this way, second UE 104-2 may extend an awake state using an inactivity timer for a relatively short period of time before transitioning to a sleep state (or may forgo extending the awake state). In contrast, when the CBR is relatively low (and the resource pool is relatively uncongested) and/or the packet priority is relatively high, first UE 104-1 may determine to make a plurality of resource reservations in a relatively large set of resources outside of second UE 104-2's on duration. Correspondingly, second UE 104-1 may set a value for the inactivity timer to a relatively small number or a relatively large number based at least in part on the CBR range for the resource pool.

In this way, based at least in part on determining whether second UE 104-2's inactivity timer is activated (and second UE 104-2 correspondingly determining whether to use an inactivity timer), first UE 104-1 ensures that DRX patterns may only become misaligned when the resource pool does not have a threshold level of traffic (and thus, collisions are unlikely) or a packet priority (e.g., the PPPP) satisfies a threshold (in which case, it may be desirable to allow a small number of collisions to avoid delaying high priority packets).

Additionally, or alternatively, first UE 104-1 may determine another transmission parameter other than a CBR level and may determine whether to reserve a resource based at least in part on the other transmission parameter. For example, based at least in part on determining a threshold CBR level indicating that second UE 104-2 is to remain on beyond a DRX on duration, first UE 104-1 may determine a maximum transmit power, an MCS range, an RB range, a re-transmission range, among other examples to use for communication. Additionally, or alternatively, first UE 104-1 may determine another transmission parameter for transmission within an on duration of second UE 104-2. For example, for a CBR range, first UE 104-1 may determine a first set of parameters for resource reservations within the on duration of second UE 104-2 (e.g., for an initial transmission of a packet) and a second set of parameters for resource reservations outside the on duration of second UE 104-2 (e.g., for a re-transmission of the packet after a failure of the initial transmission of the packet). In this case, the sets of parameters may include values for a maximum transmit power, an MCS range, an RB range, or a re-transmission range, among other examples.

As further shown in FIG. 8, and by reference number 820, first UE 104-1 may selectively reserve a resource for transmission of a packet with a particular priority. For example, based at least in part on determining that a CBR level is less than a threshold CBR level for a particular priority of a packet that first UE 104-1 is to transmit, first UE 104-1 may reserve a resource outside of an on duration of second UE 104-2 for transmission. In this case, based at least in part on the CBR level being less than a threshold and first UE 104-1 making a resource reservation, second UE 104-2 may use an inactivity timer to remain in an awake state beyond an on duration of second UE 104-2 to enable second UE 104-2 to receive a transmission of a packet from first UE 104-1. In this way, by using the CBR level to determine whether to make a resource reservation outside of an on duration of second UE 104-2, first UE 104-1 reduces a likelihood of collision relative to allowing first UE 104-1 to reserve a resource for transmission without regard for a level of congestion in a resource pool and, correspondingly, a status of the inactivity timer of second UE 104-2.

In some aspects, first UE 104-1 may reserve a resource for transmission of a packet outside of an on duration of second UE 104-2 using a transmission within the on duration of second UE 104-2. For example, first UE 104-1 may include the resource reservation message within another message that is transmitted within the on duration of second UE 104-2, such as including a resource reservation for a retransmission of a first packet within an initial transmission of a second packet.

As further shown in FIG. 8, and by reference number 830, first UE 104-1 may transmit using reserved resources. For example, based at least in part on reserving a resource for transmission of a packet outside of an on duration of second UE 104-2, first UE 104-1 may transmit the packet outside of the on duration of second UE 104-2 (e.g., during an off duration). In this case, first UE 104-1 may use one or more parameters for transmission of the packet using the resource that are selected for use in transmissions outside of the on duration of second UE 104-2. For example, first UE 104-1 may use a particular maximum transmit power, MCS, or RB range, among other examples.

As indicated above, FIG. 8 is provided as an example. Other examples may differ from what is described with respect to FIG. 8.

Figure 9:
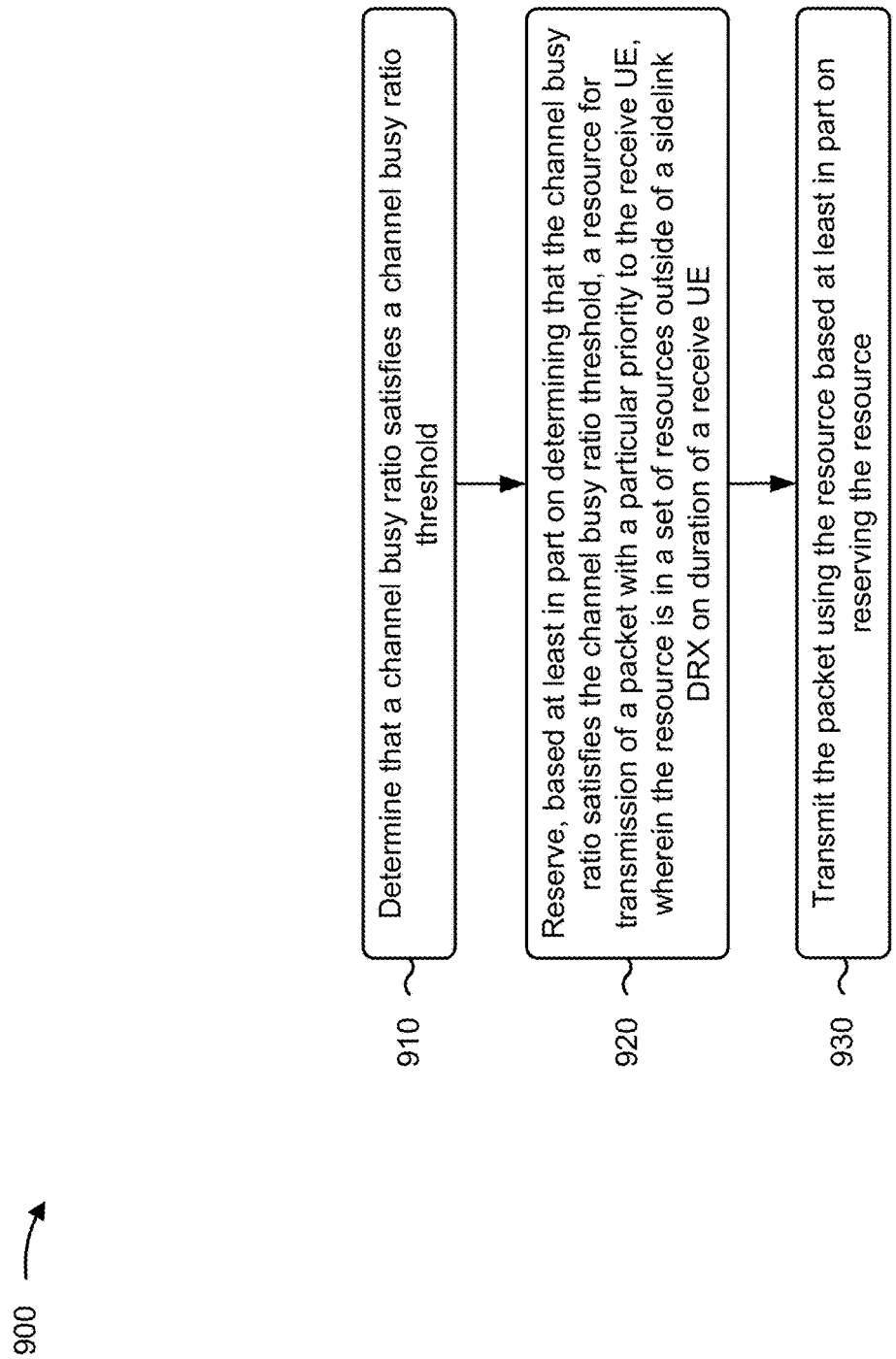
FIG. 9 is a diagram illustrating an example process associated with resource reservation in sidelink communications, in accordance with the present disclosure.

FIG. 9 is a diagram illustrating an example process 900 performed, for example, by a UE, in accordance with various aspects of the present disclosure. Example process 900 is an example where a transmit UE (e.g., UE 104) performs operations associated with resource reservation in sidelink communications.

As shown in FIG. 9, in some aspects, process 900 may include determining that a channel busy ratio satisfies a channel busy ratio threshold (block 910). For example, the transmit UE (e.g., using determination component 1008, depicted in FIG. 10) may determine that a channel busy ratio satisfies a channel busy ratio threshold, as described above.

As further shown in FIG. 9, in some aspects, process 900 may include reserving, based at least in part on determining that the channel busy ratio satisfies the channel busy ratio threshold, a resource for transmission of a packet with a particular priority to the receive UE, wherein the resource is in a set of resources outside of a sidelink DRX on duration of a receive UE (block 920). For example, the transmit UE (e.g., using resource reservation component 1010, depicted in FIG. 10) may reserve, based at least in part on determining that the channel busy ratio satisfies the channel busy ratio threshold, a resource for transmission of a packet with a particular priority to the receive UE, wherein the resource is in a set of resources outside of a sidelink DRX on duration of a receive UE, as described above.

As further shown in FIG. 9, in some aspects, process 900 may include transmitting the packet using the resource based at least in part on reserving the resource (block 930). For example, the transmit UE (e.g., using transmission component 1004, depicted in FIG. 10) may transmit the packet using the resource based at least in part on reserving the resource, as described above.

Process 900 may include additional aspects, such as any single aspect or any combination of aspects described below and/or in connection with one or more other processes described elsewhere herein.

In a first aspect, process 900 includes determining that a channel occupancy ratio satisfies a channel occupancy ratio threshold, and wherein reserving the resource comprises reserving the resource based at least in part on determining that the channel occupancy ratio satisfies the channel occupancy ratio threshold.

In a second aspect, alone or in combination with the first aspect, the set of resources includes at least one resource outside of an on duration, associated with a discontinuous reception pattern, of at least one of the transmit UE or the receive UE.

In a third aspect, alone or in combination with one or more of the first and second aspects, at least one of the transmit UE or the receive UE is operating in a sidelink DRX operation mode.

In a fourth aspect, alone or in combination with one or more of the first through third aspects, reserving the resource comprises reserving the resource based at least in part on the particular priority of the packet.

In a fifth aspect, alone or in combination with one or more of the first through fourth aspects, the channel busy ratio threshold is selected based at least in part on a corresponding channel busy ratio range of a set of channel busy ratio ranges, and wherein each channel busy ratio range is associated with a respective set of parameters, the respective set of parameters including at least one of a channel occupancy ratio parameter, a maximum transmit power parameter, or a modulation and coding scheme parameter.

In a sixth aspect, alone or in combination with one or more of the first through fifth aspects, reserving the resource comprises reserving a particular quantity of resources in a particular span of resources, wherein the particular quantity and the particular span are based at least in part on the channel busy ratio range in which the channel busy ratio occurs.

In a seventh aspect, alone or in combination with one or more of the first through sixth aspects, the channel busy ratio is within a channel busy ratio range of a set of channel busy ratio ranges.

In an eighth aspect, alone or in combination with one or more of the first through seventh aspects, reserving the resource comprises reserving the resource based at least in part on a status of a communication parameter of the receive UE, wherein the status of the communication parameter is based at least in part on the channel busy ratio, and wherein the communication parameter is at least one of a channel occupancy range parameter, a maximum transmit power parameter, a modulation and coding scheme parameter, a resource block range parameter, or a re-transmission range parameter.

In a ninth aspect, alone or in combination with one or more of the first through eighth aspects, the channel busy ratio is within a channel busy ratio range of a set of channel busy ratio ranges, and wherein each channel busy ratio range includes a corresponding value for the communication parameter of the receive UE.

In a tenth aspect, alone or in combination with one or more of the first through ninth aspects, reserving the resource comprises reserving the resource based at least in part on a remaining packet delay budget for the packet.

In an eleventh aspect, alone or in combination with one or more of the first through tenth aspects, reserving the resource comprises reserving a particular quantity of resources in a particular span of resources, wherein the particular quantity and the particular span are based at least in part on at least one of the channel busy ratio range in which the channel busy ratio occurs or a packet priority of the packet.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Example Wireless Communication Devices

Figure 10:
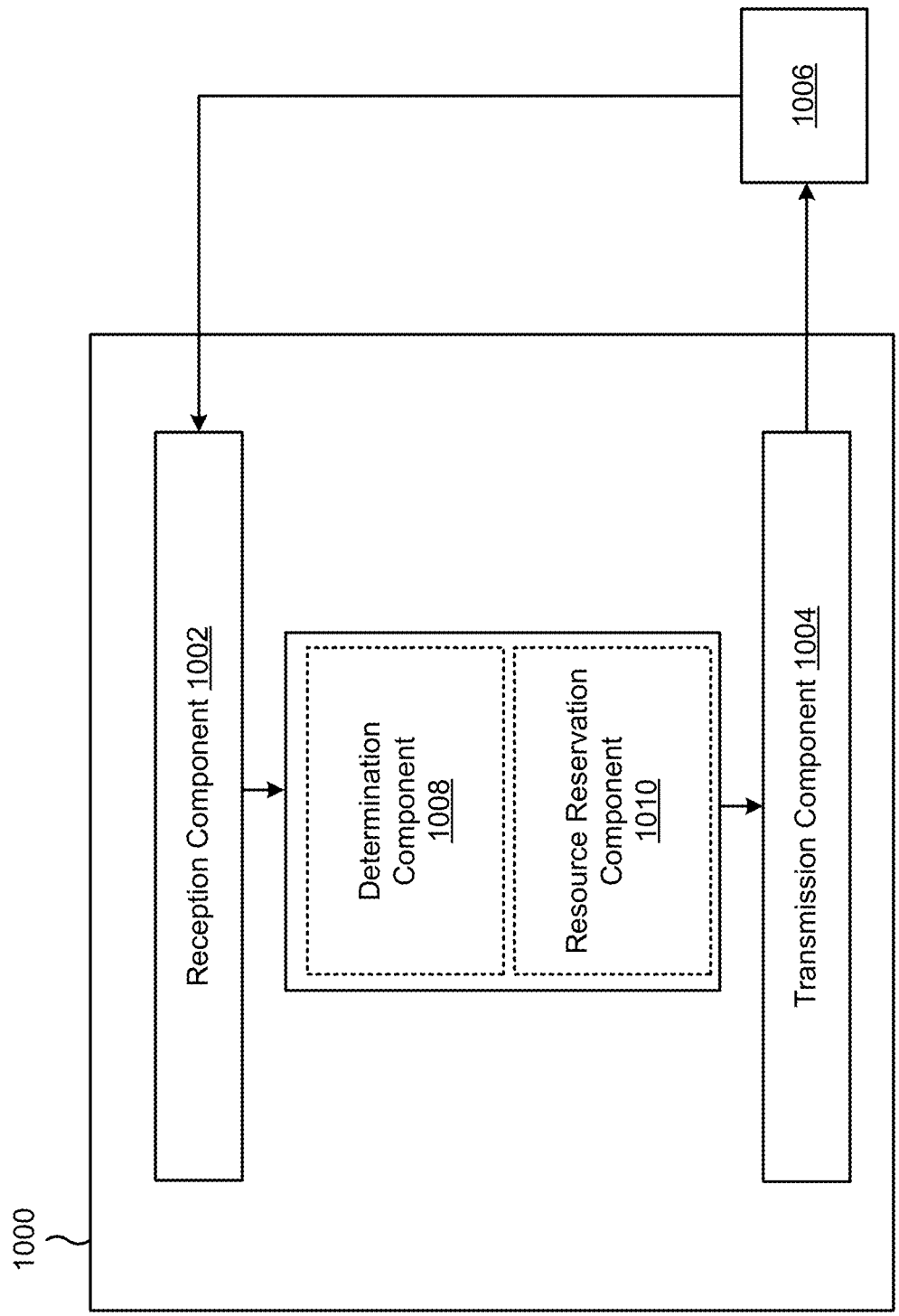
FIG. 10 is a block diagram of an example apparatus for wireless communication, in accordance with the present disclosure.

FIG. 10 is a block diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include one or more of a determination component 1008 or a resource reservation component 1010, among other examples.

In some aspects, the apparatus 1000 may be configured to perform one or more operations described herein in connection with FIG. 8. Additionally, or alternatively, the apparatus 1000 may be configured to perform one or more processes described herein, such as process 900 of FIG. 9. In some aspects, the apparatus 1000 and/or one or more components shown in FIG. 10 may include one or more components of the UE described above in connection with FIG. 2. Additionally, or alternatively, one or more components shown in FIG. 10 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component. In some aspects, the apparatus 1000 may be a communication device, such as a UE 104 as described, for example, with respect to FIGS. 1 and 2.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1006. In some aspects, the reception component 1002 may include one or more antennas, a demodulator, a MIMO detector, a receive processor, a controller/processor, a memory, or a combination thereof, of the UE described above in connection with FIG. 2.

The transmission component 1004 may transmit communications, such as reference signals, control information, data communications, or a combination thereof, to the apparatus 1006. In some aspects, one or more other components of the apparatus 1006 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modulator, a transmit MIMO processor, a transmit processor, a controller/processor, a memory, or a combination thereof, of the UE described above in connection with FIG. 2. In some aspects, the transmission component 1004 may be co-located with the reception component 1002 in a transceiver.

The determination component 1008 may determine that a channel busy ratio satisfies a channel busy ratio threshold. The resource reservation component 1010 may reserve a resource, in a set of resources, for transmission of a packet with a particular priority based at least in part on determining that the channel busy ratio satisfies the channel busy ratio threshold. The determination component 1008 may determine that a channel occupancy ratio satisfies a channel occupancy ratio threshold. The transmission component 1004 may transmit the packet using the resource based at least in part on reserving the resource.

In some aspects, the apparatus 1000 may include a processing system operatively coupled to a transceiver (e.g., a transmitter and/or a receiver). The transceiver is configured to transmit (or send) and receive signals for the apparatus 1000 via an antenna, such as the various signals as described herein. The processing system may be configured to perform processing functions for the apparatus 1000, including processing signals received and/or to be transmitted by the apparatus 1000. The processing system may include one or more processors operatively coupled to a computer-readable medium/memory via a bus. In certain aspects, the computer-readable medium/memory is configured to store instructions (e.g., computer-executable code) that when executed by the one or more processors, cause the one or more processors to perform the operations illustrated in FIGS. 7-8, or other operations for performing the various techniques described herein. In some aspects, the computer-readable medium/memory stores code for determining that a channel busy ratio satisfies a channel busy ratio threshold, code for reserving, based at least in part on determining that the channel busy ratio satisfies the channel busy ratio threshold, a resource for transmission of a packet with a particular priority to the receive UE, wherein the resource is in a set of resources outside of a sidelink DRX on duration of a receive UE, and code for transmitting the packet using the resource based at least in part on reserving the resource.

In some aspects, the one or more processors include circuitry configured to implement the code stored in the computer-readable medium/memory, including circuitry for determining that a channel busy ratio satisfies a channel busy ratio threshold, circuitry configured to reserve, based at least in part on determining that the channel busy ratio satisfies the channel busy ratio threshold, a resource for transmission of a packet with a particular priority to the receive UE, wherein the resource is in a set of resources outside of a sidelink DRX on duration of a receive UE, and circuitry configured to transmit the packet using the resource based at least in part on reserving the resource.

Various components of the apparatus 1000 may provide means for performing the methods described herein, including with respect to FIGS. 7-8. In some examples, means for determining that a channel busy ratio satisfies a channel busy ratio threshold and means for reserving a resource, in a set of resources outside of a sidelink DRX on duration of a receive UE and during a sidelink DRX off duration of the receive UE, for transmission of a packet, to the receive UE, with a particular priority based at least in part on determining that the channel busy ratio satisfies the channel busy ratio threshold may include various processing system components, such as the one or more processors of the apparatus 1000, or aspects of the UE 104 depicted in FIG. 2, including receive processor 258, transmit processor 264, TX MIMO processor 266, and/or controller/processor 280 (including resource reservation component 281).

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Example Aspects

The following provides an overview of some aspects of the present disclosure:

Aspect 1: A method of wireless communication performed by a transmit user equipment (UE), comprising: determining that a channel busy ratio satisfies a channel busy ratio threshold; reserving, based at least in part on determining that the channel busy ratio satisfies the channel busy ratio threshold, a resource for transmission of a packet with a particular priority to the receive UE, wherein the resource is in a set of resources outside of a sidelink discontinuous reception (DRX) on duration of a receive UE; and transmitting the packet using the resource based at least in part on reserving the resource.

Aspect 2: The method of aspect 1, further comprising: determining that a channel occupancy ratio satisfies a channel occupancy ratio threshold; and wherein reserving the resource comprises: reserving the resource based at least in part on determining that the channel occupancy ratio satisfies the channel occupancy ratio threshold.

Aspect 3: The method of any of aspects 1 to 2, wherein reserving the resource comprises: reserving the resource based at least in part on the particular priority of the packet.

Aspect 4: The method of any of aspects 1 to 3, wherein the channel busy ratio threshold is selected based at least in part on a corresponding channel busy ratio range of a set of channel busy ratio ranges, and wherein each channel busy ratio range is associated with a respective set of parameters, the respective set of parameters including at least one of a channel occupancy ratio parameter, a maximum transmit power parameter, or a modulation and coding scheme parameter.

Aspect 5: The method of any of aspects 1 to 4, further comprising:
determine a first set of parameters for a first resource reservation within the sidelink DRX on duration of the receive UE and a second set of parameters for a second resource reservation outside of the sidelink DRX on duration of the receive UE; and wherein transmitting the packet comprises: transmitting the packet using the resource and the first set of parameters for the resource based at least in part on the resource being within the sidelink DRX on duration of the receive UE.

Aspect 6: The method of any of aspects 1 to 5, wherein the channel busy ratio is within a channel busy ratio range of a set of channel busy ratio ranges.

Aspect 7: The method of any of aspects 1 to 6, wherein reserving the resource comprises: reserving the resource based at least in part on a status of a communication parameter of the receive UE, wherein the status of the communication parameter is based at least in part on the channel busy ratio, and wherein the communication parameter is at least one of a channel occupancy range parameter, a maximum transmit power parameter, a modulation and coding scheme parameter, a resource block range parameter, or a re-transmission range parameter.

Aspect 8: The method of aspect 7, wherein the channel busy ratio is within a channel busy ratio range of a set of channel busy ratio ranges, and wherein each channel busy ratio range includes a corresponding value for the communication parameter of the receive UE.

Aspect 9: The method of any of aspects 1 to 8, wherein reserving the resource comprises: reserving the resource based at least in part on a remaining packet delay budget for the packet.

Aspect 11: The method of any of aspects 1 to 9, wherein reserving the resource comprises: reserve a particular quantity of resources in a particular span of resources, wherein the particular quantity and the particular span are based at least in part on at least one of a channel busy ratio range in which the channel busy ratio occurs or a packet priority of the packet.

Aspect 12: An apparatus for wireless communication at a device, comprising a processor; memory coupled with the processor; and instructions stored in the memory and executable by the processor to cause the apparatus to perform the method of one or more aspects of aspects 1-9.

Aspect 13: A device for wireless communication, comprising a memory and one or more processors coupled to the memory, the memory and the one or more processors configured to perform the method of one or more aspects of aspects 1-9.

Aspect 14: An apparatus for wireless communication, comprising at least one means for performing the method of one or more aspects of aspects 1-9.

Aspect 15: A non-transitory computer-readable medium storing code for wireless communication, the code comprising instructions executable by a processor to perform the method of one or more aspects of aspects 1-9.

Aspect 16: A non-transitory computer-readable medium storing a set of instructions for wireless communication, the set of instructions comprising one or more instructions that, when executed by one or more processors of a device, cause the device to perform the method of one or more aspects of aspects 1-9.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmit user equipment (UE) configured for wireless communication, comprising:
   a memory; and
   one or more processors coupled to the memory, the one or more processors configured to cause the transmit UE to:
      determine that a channel busy ratio satisfies a channel busy ratio threshold;
      reserve, based at least in part on determining that the channel busy ratio satisfies the channel busy ratio threshold, a resource in a set of resources outside of a sidelink discontinuous reception (DRX) on duration of a receive UE, the resource being reserved for transmission of a packet with a particular priority to the receive UE; and
      transmit the packet using the resource based at least in part on reserving the resource.

2. The transmit UE of claim 1, wherein the one or more processors are further configured to cause the transmit UE to:
   determine that a channel occupancy ratio satisfies a channel occupancy ratio threshold; and
   wherein the one or more processors, when reserving the resource, are configured to cause the transmit UE to:
      reserve the resource based at least in part on determining that the channel occupancy ratio satisfies the channel occupancy ratio threshold.

3. The transmit UE of claim 1, wherein the one or more processors, when reserving the resource, are configured to cause the transmit UE to:
   reserve the resource based at least in part on the particular priority of the packet.

4. The transmit UE of claim 1, wherein the channel busy ratio threshold is selected based at least in part on a corresponding channel busy ratio range of a set of channel busy ratio ranges, and
   wherein each channel busy ratio range is associated with a respective set of parameters, the respective set of parameters including at least one of a channel occupancy ratio parameter, a maximum transmit power parameter, or a modulation and coding scheme parameter.

5. The transmit UE of claim 1, wherein the channel busy ratio is within a channel busy ratio range of a set of channel busy ratio ranges.

6. The transmit UE of claim 5, wherein the one or more processors, when reserving the resource, are configured to cause the transmit UE to:
   reserve a particular quantity of resources in a particular span of resources, wherein the particular quantity and the particular span are based at least in part on at least one of the channel busy ratio range in which the channel busy ratio occurs or a packet priority of the packet.

7. The transmit UE of claim 1, wherein the one or more processors, when reserving the resource, are configured to cause the transmit UE to:
reserve the resource based at least in part on a status of a communication parameter of the receive UE, wherein the status of the communication parameter is based at least in part on the channel busy ratio, and wherein the communication parameter is at least one of a channel occupancy range parameter, a maximum transmit power parameter, a modulation and coding scheme parameter, a resource block range parameter, or a re-transmission range parameter.

8. The transmit UE of claim 7, wherein the channel busy ratio is within a channel busy ratio range of a set of channel busy ratio ranges, and
wherein each channel busy ratio range includes a corresponding value for the communication parameter of the receive UE.

9. The transmit UE of claim 1, wherein the one or more processors, when reserving the resource, are configured to cause the transmit UE to:
reserve the resource based at least in part on a remaining packet delay budget for the packet.

10. The transmit UE of claim 1, wherein the one or more processors are further configured to cause the transmit UE to:
determine a first set of parameters for resource reservation within the sidelink DRX on duration of the receive UE and a second set of parameters for resource reservation outside of the sidelink DRX on duration of the receive UE; and
wherein the one or more processors, that cause the transmit UE to transmit the packet, cause the transmit UE to:
transmit the packet using the resource and the first set of parameters for the resource based at least in part on the resource being within the sidelink DRX on duration of the receive UE.

11. The transmit UE of claim 1, wherein the one or more processors, when reserving the resource, are further configured to cause the transmit UE to:
reserve the resource for a retransmission of the packet.

12. A method of wireless communication performed by a transmit user equipment (UE), comprising:
determining that a channel busy ratio satisfies a channel busy ratio threshold;
reserving, based at least in part on determining that the channel busy ratio satisfies the channel busy ratio threshold, a resource in a set of resources outside of a sidelink discontinuous reception (DRX) on duration of a receive UE, the resource being reserved for transmission of a packet with a particular priority to the receive UE; and
transmitting the packet using the resource based at least in part on reserving the resource.

13. The method of claim 12, further comprising:
determining that a channel occupancy ratio satisfies a channel occupancy ratio threshold; and
wherein reserving the resource comprises:
reserving the resource based at least in part on determining that the channel occupancy ratio satisfies the channel occupancy ratio threshold.

14. The method of claim 12, wherein reserving the resource comprises:
reserving the resource based at least in part on the particular priority of the packet.

15. The method of claim 12, wherein the channel busy ratio threshold is selected based at least in part on a corresponding channel busy ratio range of a set of channel busy ratio ranges, and
wherein each channel busy ratio range is associated with a respective set of parameters, the respective set of parameters including at least one of a channel occupancy ratio parameter, a maximum transmit power parameter, or a modulation and coding scheme parameter.

16. The method of claim 12, wherein the channel busy ratio is within a channel busy ratio range of a set of channel busy ratio ranges.

17. The method of claim 16, wherein reserving the resource comprises:
reserving a particular quantity of resources in a particular span of resources, wherein the particular quantity and the particular span are based at least in part on at least one of the channel busy ratio range in which the channel busy ratio occurs or a packet priority of the packet.

18. The method of claim 12, wherein reserving the resource comprises:
reserving the resource based at least in part on a status of a communication parameter of the receive UE, wherein the status of the communication parameter is based at least in part on the channel busy ratio, and wherein the communication parameter is at least one of a channel occupancy range parameter, a maximum transmit power parameter, a modulation and coding scheme parameter, a resource block range parameter, or a re-transmission range parameter.

19. The method of claim 18, wherein the channel busy ratio is within a channel busy ratio range of a set of channel busy ratio ranges, and
wherein each channel busy ratio range includes a corresponding value for the communication parameter of the receive UE.

20. The method of claim 12, wherein reserving the resource comprises:
reserving the resource based at least in part on a remaining packet delay budget for the packet.

21. The method of claim 12, further comprising:
determining a first set of parameters for a first-resource reservation within the sidelink DRX on duration of the receive UE and a second set of parameters for resource reservation outside of the sidelink DRX on duration of the receive UE; and
wherein transmitting the packet comprises:
transmitting the packet using the resource and the first set of parameters for the resource based at least in part on the resource being within the sidelink DRX on duration of the receive UE.

22. The method of claim 12, wherein reserving the resource comprises:
reserving the resource for a retransmission of the packet.

23. A non-transitory computer-readable medium storing a set of instructions for wireless communication, the set of instructions comprising:
one or more instructions that, when executed by one or more processors of a transmit user equipment (UE), cause the UE to:
determine that a channel busy ratio satisfies a channel busy ratio threshold;

reserve, based at least in part on determining that the channel busy ratio satisfies the channel busy ratio threshold, a resource in a set of resources outside of a sidelink discontinuous reception (DRX) on duration of a receive UE, the resource being reserved for transmission of a packet with a particular priority to the receive UE; and transmit the packet using the resource based at least in part on reserving the resource.

24. The non-transitory computer-readable medium of claim 23, wherein the one or more instructions further cause the UE to:

determine that a channel occupancy ratio satisfies a channel occupancy ratio threshold; and wherein the one or more instructions, that cause the UE to reserve the resource, cause the UE to:

reserve the resource based at least in part on determining that the channel occupancy ratio satisfies the channel occupancy ratio threshold.

25. The non-transitory computer-readable medium of claim 23, wherein the one or more instructions, that cause the UE to reserve the resource, cause the UE to:

reserve the resource based at least in part on the particular priority of the packet.

26. The non-transitory computer-readable medium of claim 23, wherein the channel busy ratio threshold is selected based at least in part on a corresponding channel busy ratio range of a set of channel busy ratio ranges, and wherein each channel busy ratio range is associated with a respective set of parameters, the respective set of parameters including at least one of a channel occupancy ratio parameter, a maximum transmit power parameter, or a modulation and coding scheme parameter.

27. An apparatus for wireless communication, comprising:

means for determining that a channel busy ratio satisfies a channel busy ratio threshold;

means for reserving, based at least in part on determining that the channel busy ratio satisfies the channel busy ratio threshold, a resource in a set of resources outside of a sidelink discontinuous reception (DRX) on duration of a receive UE, the resource being reserved for transmission of a packet with a particular priority to the receive UE; and means for transmitting the packet using the resource based at least in part on reserving the resource.

28. The apparatus of claim 27, further comprising:

means for determining that a channel occupancy ratio satisfies a channel occupancy ratio threshold; and wherein the means for reserving the resource are configured to:

means for reserving the resource based at least in part on determining that the channel occupancy ratio satisfies the channel occupancy ratio threshold.

29. The apparatus of claim 27, wherein the means for reserving the resource are configured to:

means for reserving the resource based at least in part on the particular priority of the packet.

30. The apparatus of claim 27, wherein the channel busy ratio threshold is selected based at least in part on a corresponding channel busy ratio range of a set of channel busy ratio ranges, and wherein each channel busy ratio range is associated with a respective set of parameters, the respective set of parameters including at least one of a channel occupancy ratio parameter, a maximum transmit power parameter, or a modulation and coding scheme parameter.

* * * * *